US012736849B1

(12) United States Patent
Hsu et al.

(10) Patent No.: US 12,736,849 B1
(45) Date of Patent: Sep. 15, 2026

(54) DISPLAY SYSTEM AND DISPLAY METHOD FOR VEHICLE

(71) Applicant: Wistron Corporation, New Taipei City (TW)

(72) Inventors: Chin Hao Hsu, New Taipei City (TW); Ming Chiuan Jing, New Taipei City (TW)

(73) Assignee: Wistron Corporatino, New Taipei City (TW)

( * ) Notice: Subject to any disclaimer, the term of this patent is extended or adjusted under 35 U.S.C. 154(b) by 0 days.

(21) Appl. No.: 19/309,593

(22) Filed: Aug. 25, 2025

(30) Foreign Application Priority Data

Jul. 17, 2025 (TW) ................................ 114127145

(51) Int. Cl.

| | |
|---|---|
| ***G02F 1/163*** | (2006.01) |
| ***B60K 35/232*** | (2024.01) |
| ***G02B 27/01*** | (2006.01) |
| ***G06T 5/80*** | (2024.01) |
| ***G06T 7/136*** | (2017.01) |
| ***G06T 7/73*** | (2017.01) |
| ***G09G 3/00*** | (2006.01) |

(52) U.S. Cl.

CPC ............ *G02F 1/163* (2013.01); *B60K 35/232* (2024.01); *G06T 5/80* (2024.01); *G06T 7/136* (2017.01); *G06T 7/73* (2017.01); *G09G 3/002* (2013.01); *B60K 2360/166* (2024.01); *B60K 2360/167* (2024.01); *B60K 2360/169* (2024.01); *G02B 27/0101* (2013.01); *G06T 2207/30252* (2013.01); *G09G 2320/0693* (2013.01)

(58) Field of Classification Search

CPC . G02F 1/163; G06T 7/136; G06T 7/73; G06T 5/80; G06T 2207/30252; B60K 35/232; B60K 2360/166; B60K 2360/167; B60K 2360/169; G09G 3/002; G09G 2320/0693; G02B 27/0101

USPC ............................................................ 345/7

See application file for complete search history.

(56) References Cited

U.S. PATENT DOCUMENTS

2008/0089611 A1* 4/2008 McFadyen ................ G06T 5/80 382/289
2021/0224974 A1* 7/2021 Gandara .............. H04N 23/695
2024/0399860 A1* 12/2024 Diamond ................ G02B 5/32

FOREIGN PATENT DOCUMENTS

DE 102017219737 A1 * 5/2019 ......... G02B 27/0101

* cited by examiner

*Primary Examiner* — Mark Edwards

(74) *Attorney, Agent, or Firm* — JCIPRNET

(57) ABSTRACT

The present invention provides a display system and a method for a vehicle. The system includes a display device and a processor. The display device projects an image beam toward a transparent component of the vehicle. The processor determines whether the display device is in a first mode or a second mode. A focal length of the display device in the first mode is greater than a focal length of the display device in the second mode. In the first mode, the display device generates the image beam based on inward information. In the second mode, the display device generates the image beam based on outward information.

14 Claims, 9 Drawing Sheets

141

09XX-00

DISPLAY SYSTEM AND DISPLAY METHOD FOR VEHICLE

CROSS-REFERENCE TO RELATED APPLICATION

This application claims the priority benefit of Taiwan application serial no. 114127145, filed on Jul. 17, 2025. The entirety of the above-mentioned patent application is hereby incorporated by reference herein and made a part of this specification.

BACKGROUND

Technical Field

The present disclosure relates to a display system and display method for a head-up display in a vehicle.

Related Art

With the rapid development of automotive electronic technology, Head-Up Display (HUD) has gradually become one of the standard equipment in modern vehicles. The main function of the head-up display is to project vehicle-related information (such as vehicle speed, navigation instructions, warning signals, etc.) onto the windshield in front of the driver, allowing the driver to obtain necessary information while keeping their line of sight on the road ahead, thereby enhancing driving safety and convenience.

However, in existing technology, the projection content of the head-up display may be limited by the optical properties of the windshield. Due to factors such as curvature variations or manufacturing processes of the windshield itself, the projected patterns may experience deformation or ghosting issues, affecting the accuracy of information interpretation and visual quality. Therefore, existing systems typically require additional calibration mechanisms to correct projection distortion caused by glass deformation, ensuring that the head-up display may accurately project images at the expected position and shape.

SUMMARY

To solve the above problems, the present disclosure provides a vehicle display system including a display device and a processor. The display device is configured to project an image beam toward a transparent component of the vehicle. The processor is electrically connected to the display device and is configured to determine whether the display device is in a first mode or a second mode. A focal length of the display device in the first mode is greater than a focal length of the display device in the second mode. In the first mode, the display device generates the image beam based on inward information. In the second mode, the display device generates the image beam based on outward information.

From another perspective, embodiments of the present invention provide a vehicle display method executed by a processor. The vehicle display method includes: determining whether a display device is in a first mode or a second mode; and setting a focal length of the display device in the first mode to be greater than a focal length of the display device in the second mode; in the first mode, controlling the display device to generate a first image beam based on inward information to project toward a transparent component; and in the second mode, controlling the display device to generate a second image beam based on outward information to project toward the transparent component.

To make the above features and advantages of the present invention more apparent and understandable, embodiments are specifically provided below and described in detail with reference to the accompanying drawings.

DESCRIPTION OF THE EMBODIMENTS

Some embodiments of the present invention will be described in detail with reference to the accompanying drawings. The element symbols referenced in the following description, when the same element symbols appear in different drawings, shall be regarded as the same or similar elements. These embodiments are only a part of the present invention and do not disclose all possible implementations of the present invention. More specifically, these embodiments are merely examples of the systems and methods within the scope of the patent application of the present invention.

Regarding "first," "second," etc. used herein, these do not particularly refer to order or sequence, but are merely used to distinguish elements or operations described with the same technical terms.

Figure 1:
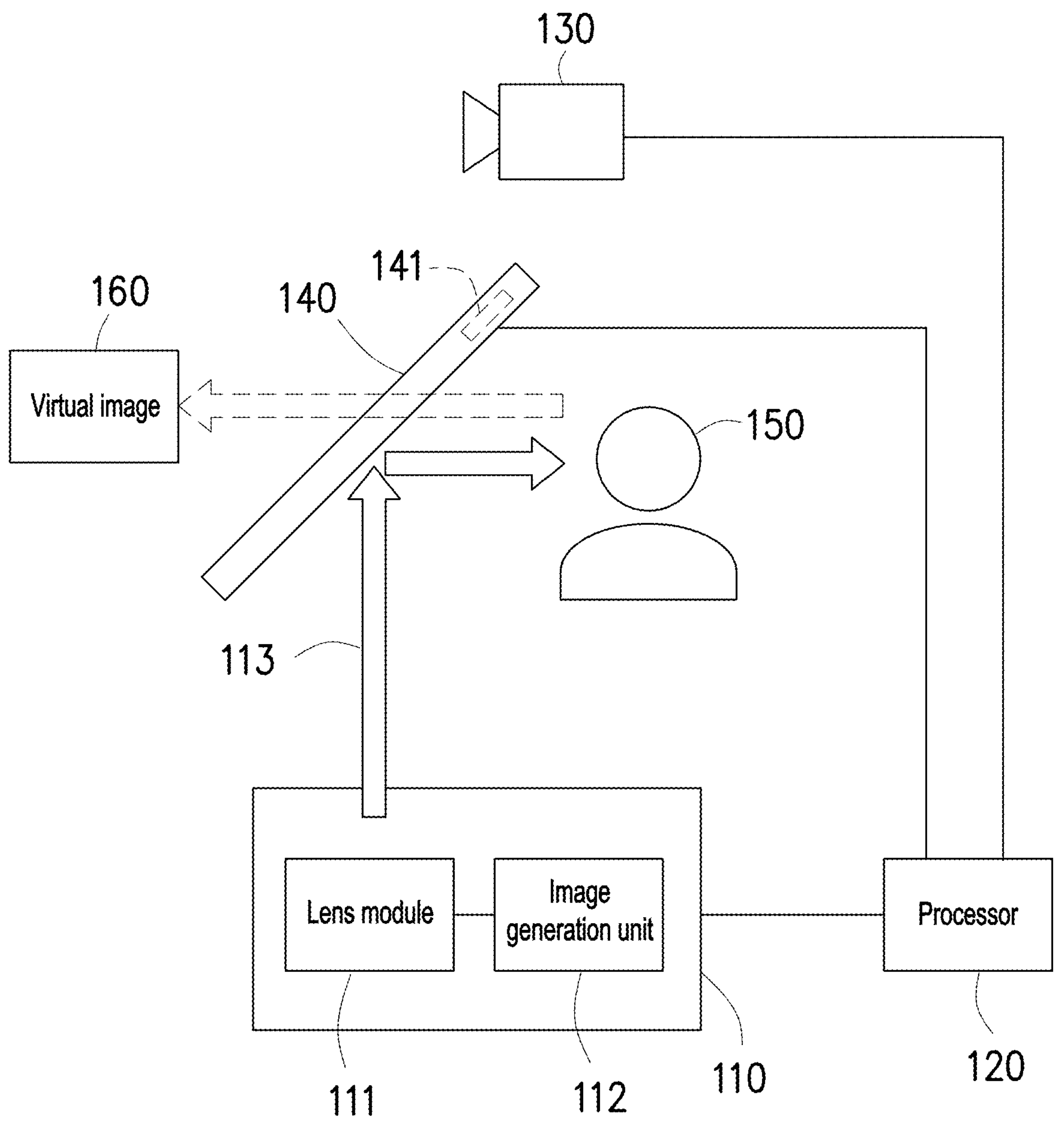
FIG. 1 is a schematic diagram illustrating a vehicle display system in a first mode according to an embodiment.

FIG. 1 is a schematic diagram illustrating a vehicle display system in a first mode according to an embodiment. Referring to FIG. 1, a vehicle display system 100 is installed on a vehicle. The vehicle display system 100 includes a display device 110, a processor 120, and an image sensor 130. The display device 110 may also be referred to as a head-up display, which includes a lens module 111 and an image generation unit 112. The processor 120 may include a central processing unit, a microprocessor, a microcontroller, a graphics processing unit (GPU), Application Specific Integrated Circuits (ASIC), or a Programmable Logic Device (PLD). The image sensor 130 may include a Charge-coupled Device (CCD) sensor, a Complementary Metal-Oxide Semiconductor (CMOS) sensor, or other suitable photosensitive elements. In some embodiments, the image sensor 130 may further include a structured light sensing device, a laser, or any component capable of sensing scene depth.

The lens module 111 includes one or more lenses, and the focal length of the lens module 111 is variable. For example, the lens module 111 includes a liquid lens, a piezoelectric driven lens, or a liquid crystal lens, etc., and the present invention is not limited thereto. The image generation unit 112 is, for example, a liquid crystal display panel, a digital light processing (DLP) circuit, a Liquid Crystal on Silicon panel, or an organic light-emitting diode panel, etc., for receiving image data from the processor 120 and generating an image beam. The image beam passes through the lens module 111 and then forms an image beam 113 that is emitted to the transparent component 140. In this embodiment, the transparent component 140 is a front windshield, but in other embodiments, the transparent component 140 may also be a rear windshield, a sunroof, or side glass, etc.

The transparent component 140 includes an electrochromic module 141, such as Electrochromic Glass or Polymer Dispersed Liquid Crystal (PDLC). The processor 120 is electrically connected to the electrochromic module 141 for controlling the electrochromic module 141 to switch between a transparent state and a hazy state. In this example, the electrochromic module 141 is disposed at an upper edge of the transparent component 140, but in other embodiments, it may also be disposed at a lower edge or a side of the transparent component 140.

Figure 2:
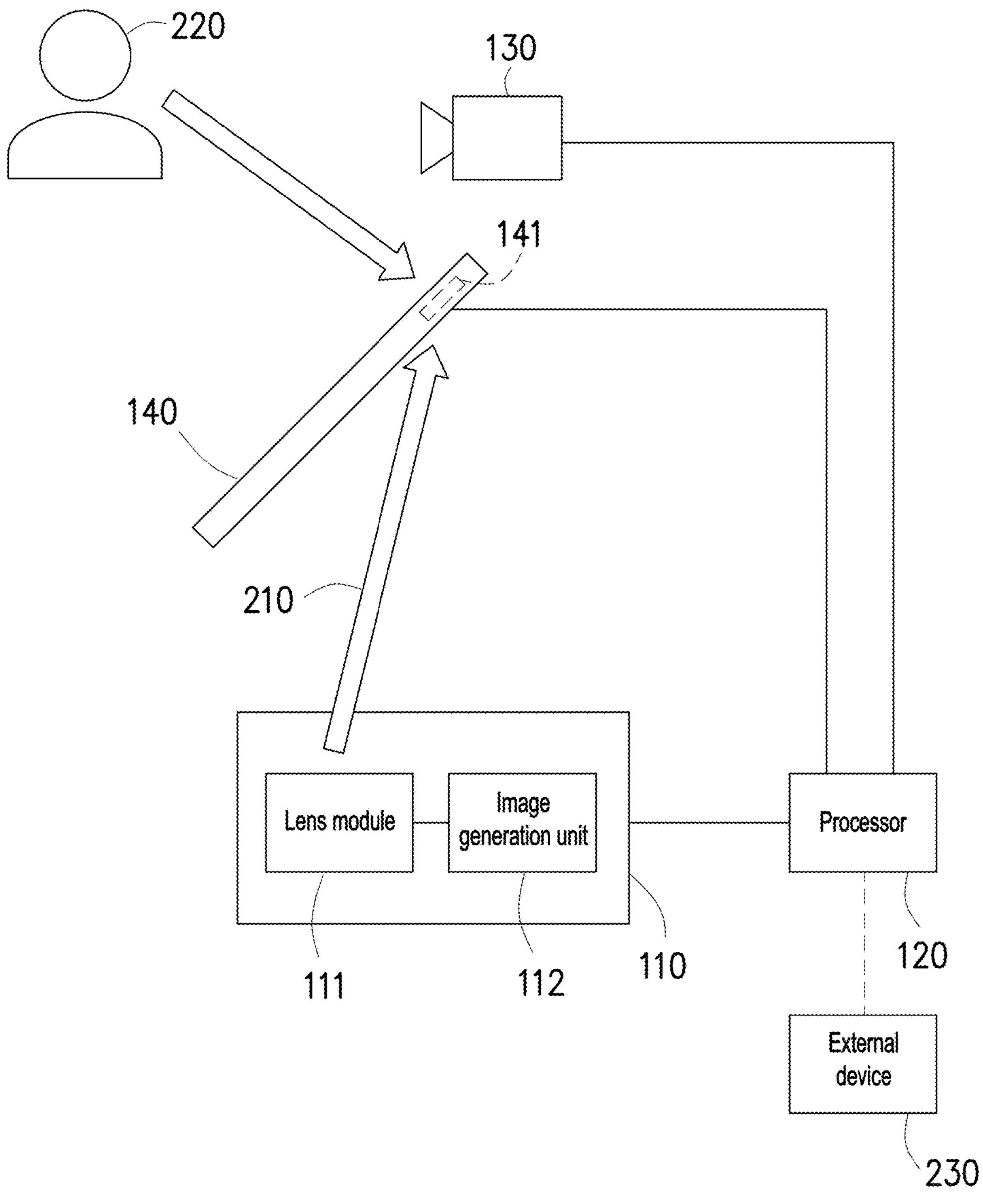
FIG. 2 is a schematic diagram illustrating a second mode according to an embodiment.

The processor 120 is electrically connected to the display device 110, the image sensor 130, and the electrochromic module 141. The processor 120 is configured to determine whether the vehicle display system 100 is in a first mode or a second mode. The first mode is also referred to as a head-up display mode or an inward mode, where the image beam 113 emitted by the display device 110 is for viewing by a driver 150 inside the vehicle. Specifically, after the image beam 113 is projected toward the transparent component 140, a portion of the light will be reflected to the driver 150 to form a virtual image 160 outside the vehicle. FIG. 2 is a schematic diagram illustrating the second mode according to an embodiment. In the second mode, an image beam 210 emitted by the display device 110 is mainly for viewing by a user 220 outside the vehicle. After the image beam 210 is projected toward the transparent component 140, the user 220 will see a real image on the transparent component 140. Please refer to FIG. 1 and FIG. 2, in order to achieve the above difference between the virtual image and the real image, the focal length of the display device 110 in the first mode is greater than the focal length of the display device 110 in the second mode. For example, in the second mode, the focal length of the display device 110 may be set so that the image beam 210 is imaged exactly on the transparent component 140. In the first mode, the focal length of the display device 110 is greater, so that the driver 150 perceives that the virtual image 160 is imaged outside the vehicle.

In some embodiments, the display device 110 also emits image beams at different angles in the two modes, and may be used in conjunction with the electrochromic module 141. In the first mode, the image beam 113 may be projected toward a line-of-sight area of the transparent component 140, but in the second mode, the image beam 210 may be projected toward a non-line-of-sight area of the transparent component 140 (for example, the position of the electrochromic module 141). In the first mode, the processor 120 controls the electrochromic module 141 to be in a transparent state to avoid affecting the driver's line of sight. In the second mode, the processor 120 controls the electrochromic module 141 to be in a hazy state, and the image beam 210 is projected toward the electrochromic module 141, thereby making the real image clearer.

Figures 3A, 3B:
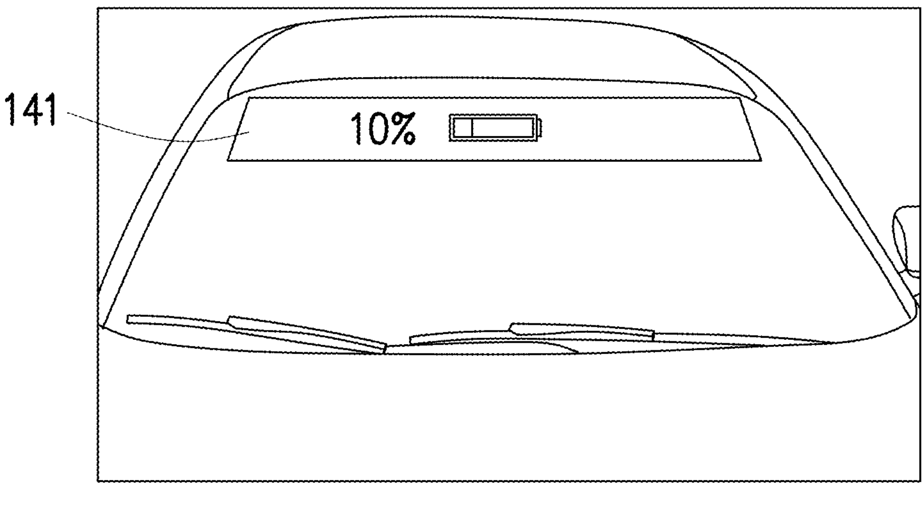
FIG. 3A and FIG. 3B are schematic diagrams showing display information in a second mode according to an embodiment.

The information displayed in the two modes is different. In the first mode, the display device 110 generates the image beam 113 based on inward information. In the second mode, the display device 110 generates the image beam based on outward information. The inward information includes vehicle speed information, navigation information, or vehicle detection information. The outward information may include charging information, contact information, barcodes, or advertisements. For example, FIG. 3A and FIG. 3B are schematic diagrams showing displayed information in the second mode according to an embodiment. In the example of FIG. 3A, the electrochromic module 141 is in the hazy state, and the displayed information is about the charging status of an electric vehicle. In the example of FIG. 3B, the electrochromic module 141 is also in the hazy state, and the displayed information is about the driver's contact information.

Please refer to FIG. 2, the driver may set the outward information by themselves. For example, an external device 230 is the driver's mobile phone, and the external device 230 may be communicatively connected to the processor 120. The driver may input their own defined settings through a suitable application or network platform, and these settings will be transmitted to the processor 120. The processor 120 may determine the outward information based on these settings, such as displaying the driver's mobile phone number, vehicle parking duration, etc. In some embodiments, the outward information may also be advertisements, earning some advertising revenue by displaying advertisements on the vehicle. In some embodiments, the outward information may also be barcodes for linking to any network address.

In some embodiments, the position where the outward information is displayed on the transparent component 140 may also be determined based on the position of the user 220. Specifically, the image sensor 130 is used to capture environmental images about the exterior of the vehicle. The processor 120 receives the environmental images and detects objects (such as people) in the environmental images, and then determines the position where the outward information is displayed on the transparent component 140 based on the position of the object. The position of the outward information may move together with the position of the user 220, thereby allowing the user 220 to clearly see the outward information from any angle or position.

The transparent component 140 may have different shapes on different vehicles. The display device 110 may also have different installation positions on different vehicles. When the display device 110 is to display an image on the transparent component 140, a transformation matrix is used to convert the coordinates of the image to coordinates on the transparent component 140. A calibration procedure will be executed below to calibrate this transformation matrix, avoiding distortion and deformation of the image projected on the transparent component 140.

Figure 4:
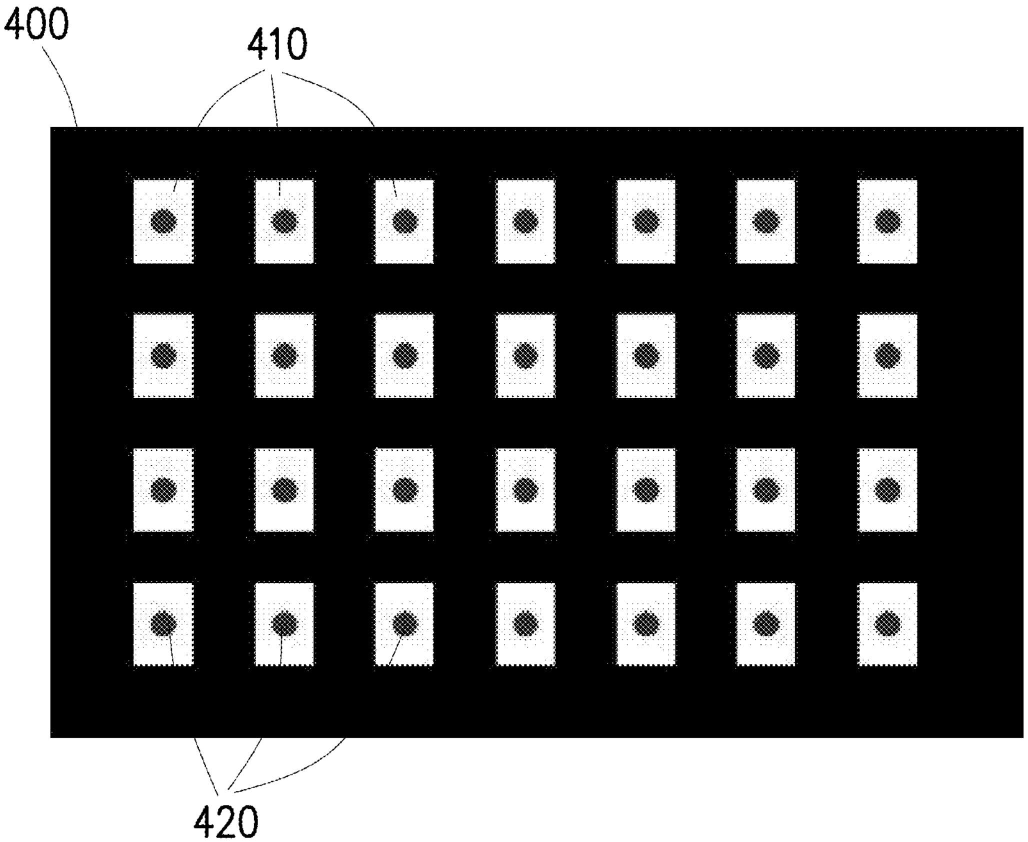
FIG. 4 is a schematic diagram illustrating a reference image according to an embodiment.

In some embodiments, if the image sensor 130 has a rolling shutter phenomenon, this will cause the captured images to be incomplete, thereby affecting the calibration procedure. In this embodiment, feature points will be added to a reference image for calibration, and these feature points are more resistant to phenomena such as light and shadow changes, distortion and deformation, and rolling shutter. FIG. 4 is a schematic diagram illustrating a reference image according to an embodiment. Please refer to FIG. 4, the reference image 400 includes a plurality of first patterns 410, and these first patterns 410 are, for example, rectangles.

Each first pattern 410 includes a second pattern 420, and these second patterns 420 are, for example, red circles. The shape and color of the first patterns 410 are different from the shape and color of the second patterns 420. In this embodiment, the second patterns 420 are circles because the symmetry of circles is more suitable for detecting their center points and is less susceptible to geometric deformation. However, the present invention is not limited thereto, and in other embodiments, the second patterns 420 may also be other shapes.

Figure 5:
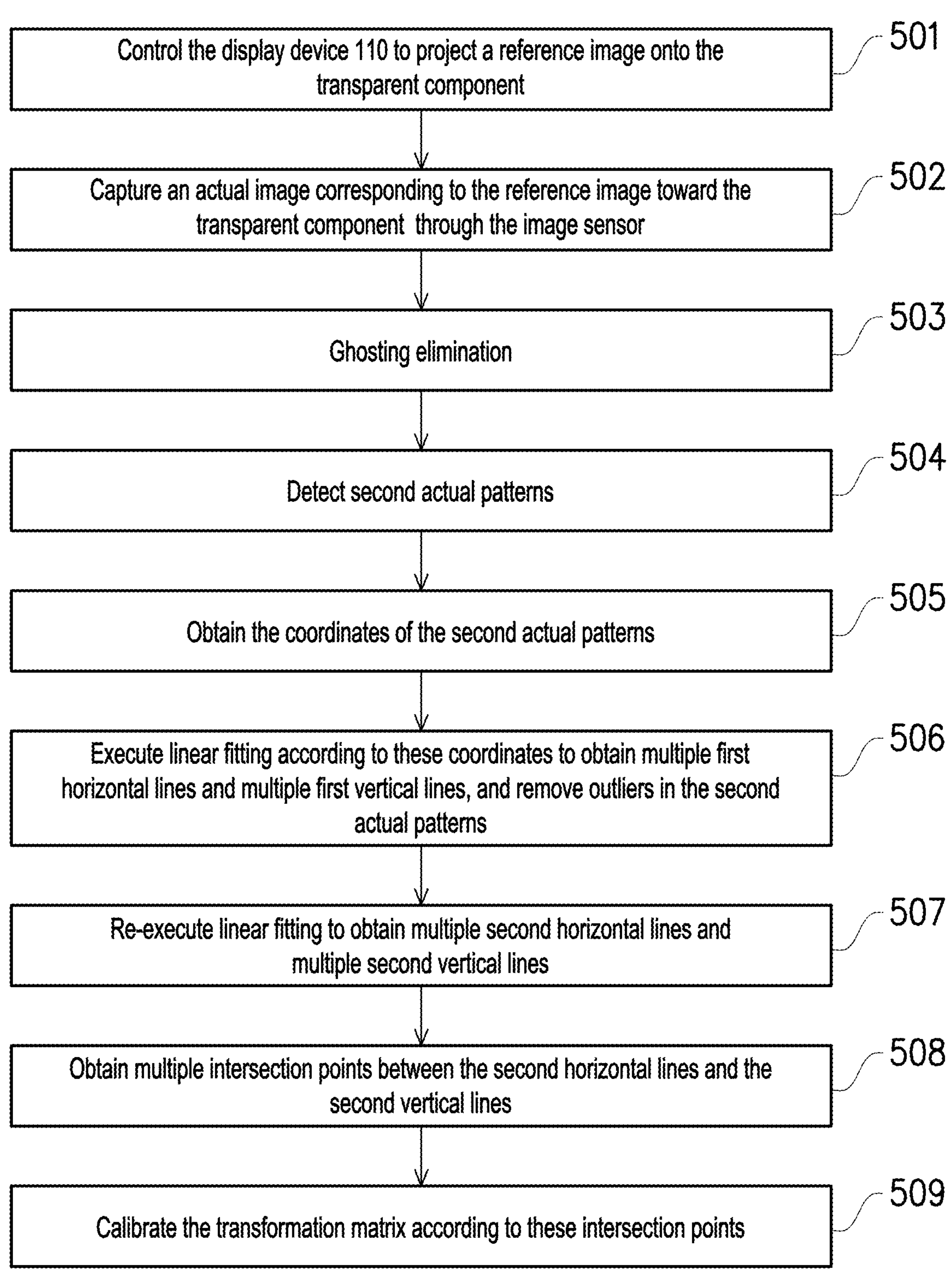
FIG. 5 is a flowchart illustrating a calibration procedure according to an embodiment.

FIG. 5 is a flowchart illustrating a calibration procedure according to an embodiment. These steps may be executed by the processor 120 or other computer systems, which will not be described in detail below. Please refer to FIG. 5, in step 501, the display device 110 is controlled to project a reference image onto the transparent component 140. In step 502, an actual image corresponding to the reference image is captured toward the transparent component 140 through the image sensor 130. In some embodiments, the transparent component 140 has multiple layers, and each layer will reflect part of the light to the image sensor 130, thereby causing a ghosting phenomenon. In step 503, ghosting is eliminated. For detailed steps, please refer to FIG. 6, which is a flowchart illustrating ghosting elimination according to an embodiment. FIG. 7 is a schematic diagram illustrating images at various stages during ghosting elimination according to an embodiment.

Figure 6:
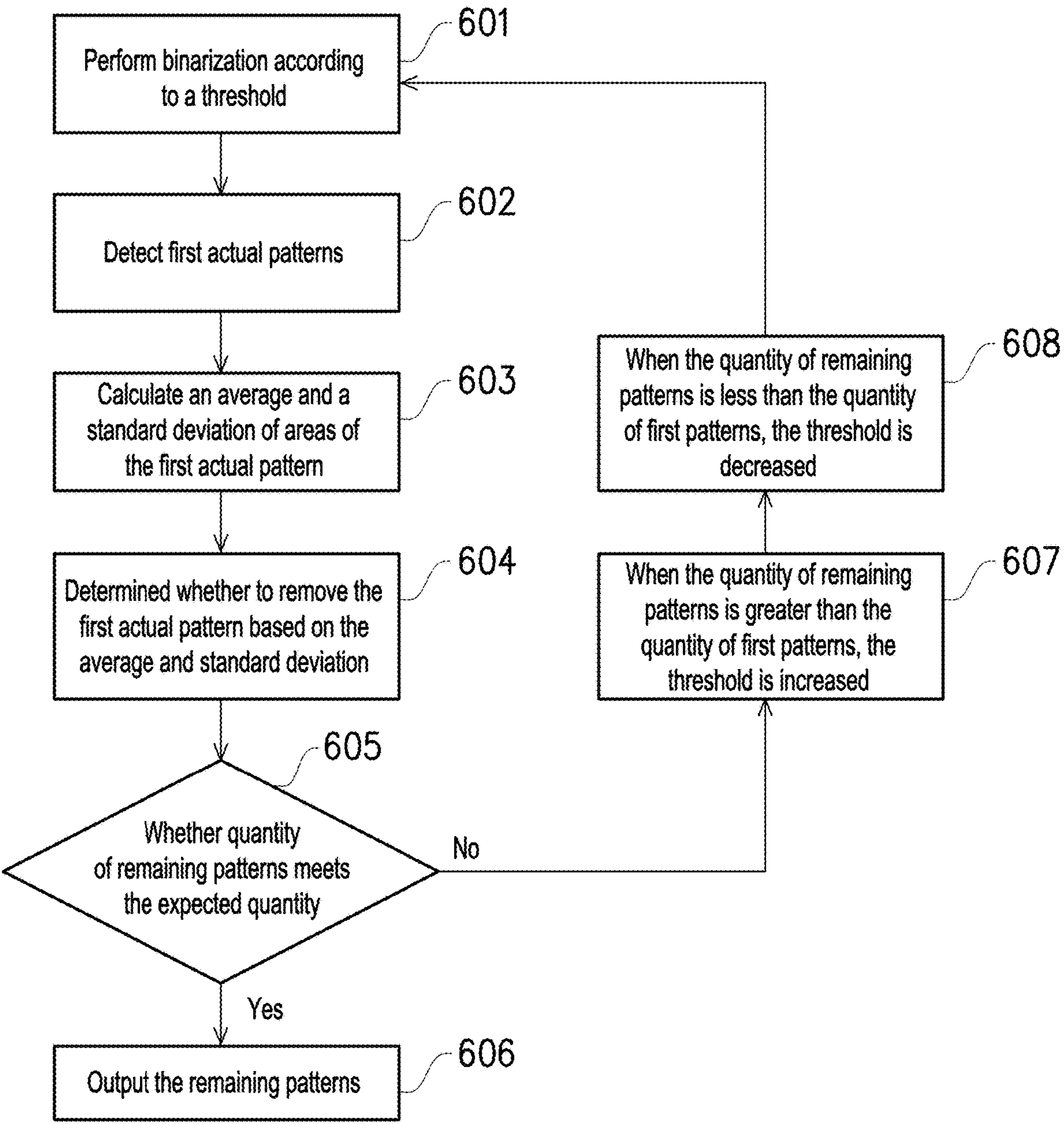
FIG. 6 is a flowchart illustrating ghost elimination according to an embodiment.
Figure 7:
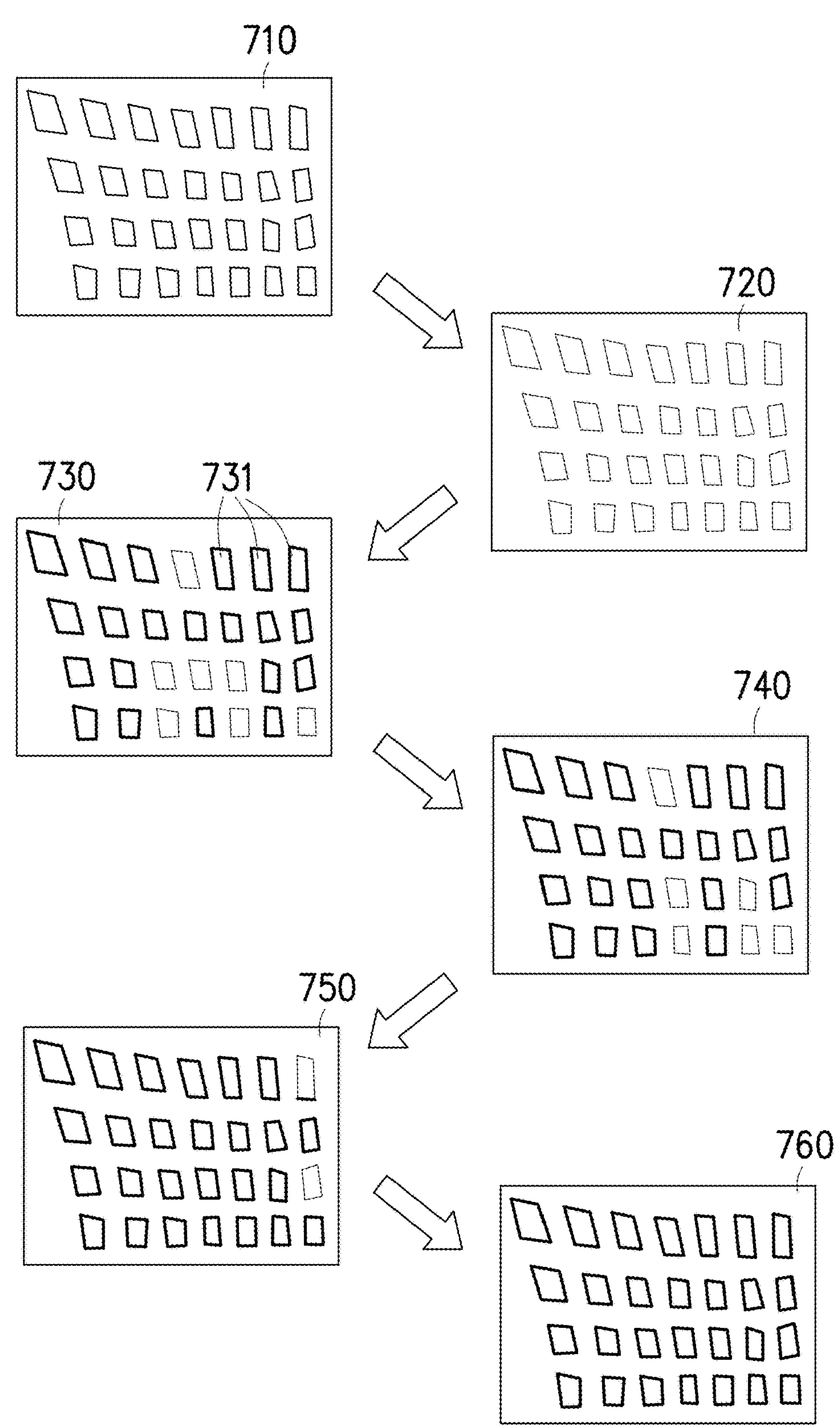
FIG. 7 is a schematic diagram illustrating images at various stages during ghost elimination according to an embodiment.

Please refer to FIG. 6 and FIG. 7, the captured actual image 710 shows that these rectangles have deformation. In step 601, binarization is performed according to a threshold. First, the actual image 710 may be converted to a grayscale image 720, and then it is determined whether the grayscale value of each pixel is greater than the threshold. If so, the corresponding pixel in the binarized image is set to "1". If the grayscale value of a pixel in the grayscale image 720 is less than or equal to the threshold, the corresponding pixel in the binarized image is set to "0".

In step 602, first actual patterns are detected. These first actual patterns correspond to the aforementioned first patterns. The first patterns are rectangles, and since the rectangles will undergo deformation, quadrilaterals are detected here, where any suitable tool (such as OpenCV) or algorithm may be used to detect quadrilaterals. For example, contours in the binarized image may be detected first, and then the coordinates of these contours are input to a function to obtain the coordinates of four corners in the quadrilateral. If the coordinates of these contours are not quadrilaterals (the error is too large), the function will return a value indicating that no quadrilateral exists. For example, in an image 730, multiple first actual patterns 731 are marked with quadrilateral frames. Since some quadrilateral contours in the image 730 are incomplete or unclear, they will not be determined (i.e. without bold mark) as first actual patterns.

In step 603, the area of each first actual pattern is calculated, and then the average and standard deviation of these areas are calculated. In step 604, it is determined whether to remove the first actual pattern based on the average and standard deviation. In some embodiments, if the area of a first actual pattern is less than ½ of the average, this first actual pattern is removed. On the other hand, if the area of a first actual pattern is greater than the average plus N times the standard deviation, this first actual pattern is also removed, where N is a positive integer, for example, 3. After removing the first actual patterns with areas that are too large and too small, the remaining first actual patterns are called remaining patterns.

In step 605, it is determined whether the quantity of the remaining patterns meets the expected quantity (i.e. the quantity of first patterns in the reference image). If the quantity of remaining patterns meets the expected quantity, the remaining patterns are output in step 606. If the quantity of remaining patterns does not meet the expected quantity, the threshold is adjusted. Specifically, in step 607, when the quantity of remaining patterns is greater than the quantity of first patterns, the threshold is increased. In step 608, when the quantity of remaining patterns is less than the quantity of first patterns, the threshold is decreased. Then the process returns to step 601. When the threshold is increased, the quantity of first actual patterns will decrease in the next iteration; conversely, when the threshold is decreased, the quantity of first actual patterns will increase in the next iteration. Steps 601~605, 607, 608 will be repeated continuously (forming multiple iterations) until the quantity of remaining patterns is the same as the quantity of first patterns. As shown in FIG. 7, the first iteration will generate the image 730, the second iteration generates an image 740, the third iteration generates an image 750, and the fourth iteration generates an image 760. In the fourth iteration, the quantity of remaining patterns is the same as the quantity of first patterns, so the iteration will stop and these remaining patterns will be output.

Figure 8:
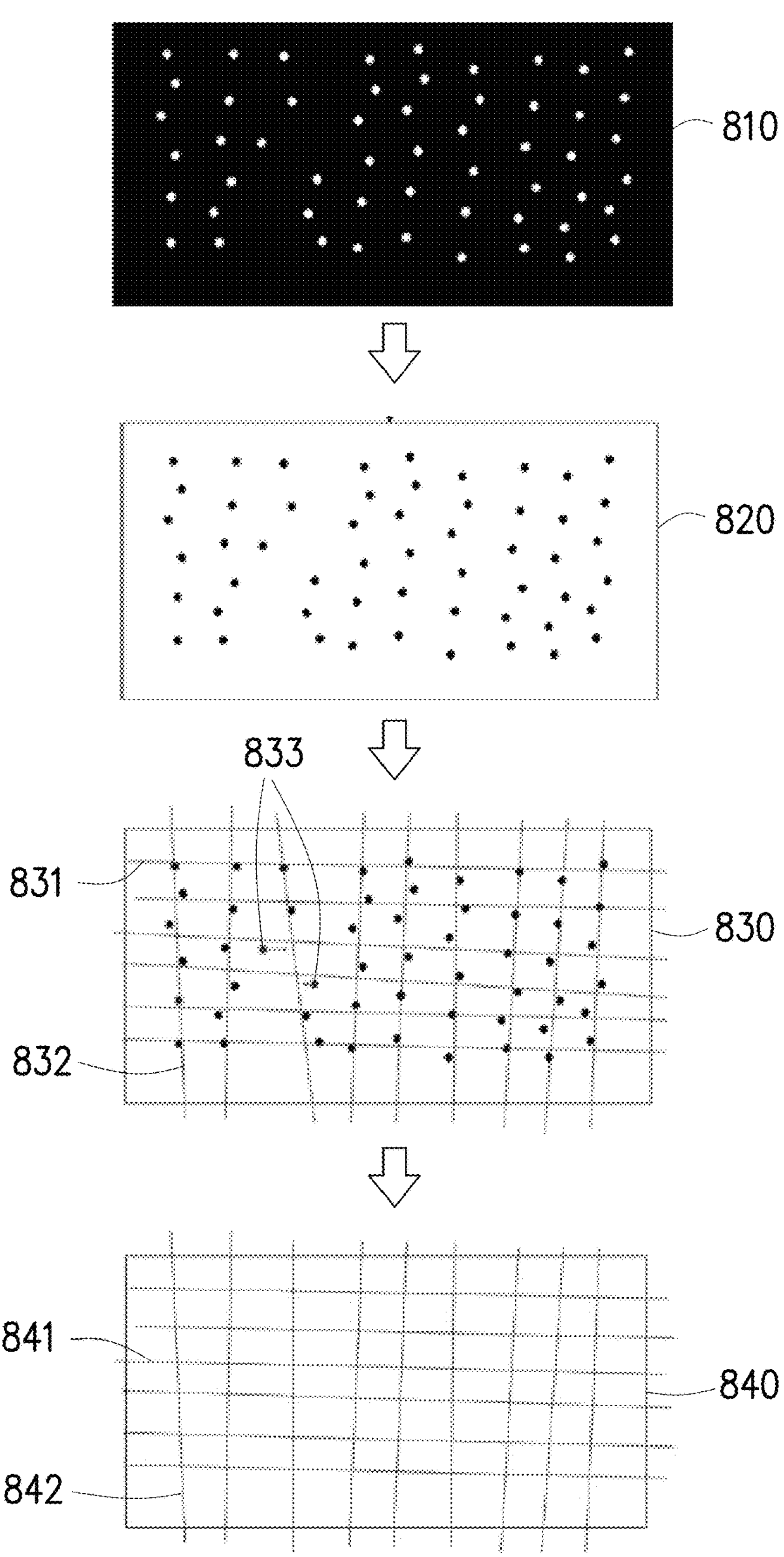
FIG. 8 is a schematic diagram illustrating images of some steps in a calibration procedure according to an embodiment.

FIG. 8 is a schematic diagram showing images of some steps in the calibration procedure according to an embodiment. Please refer to FIG. 5 and FIG. 8, in step 504, within the range defined by the remaining patterns, multiple second actual patterns are detected from the actual image, these second actual patterns correspond to the aforementioned second patterns, which are also circular. Since in this embodiment the remaining patterns (quadrilaterals) have been defined first and then the second actual patterns are detected, this is more efficient compared to detecting second actual patterns from the entire actual image. In some embodiments, the second patterns are red, so the red channel may first be obtained from the actual image, and then binarized to obtain the second actual patterns. For example, an image 810 represents the result of this binarization.

In step 505, the coordinates of the second actual patterns are obtained. For example, the positions of these coordinates are marked in an image 820. In step 506, linear fitting is executed according to these coordinates to obtain multiple first horizontal lines (for example, horizontal line 831) and multiple first vertical lines (for example, vertical line 832), and outliers in the second actual patterns are removed. Each horizontal line and vertical line has its respective range, and only coordinates within the range will be used for linear fitting. After linear fitting, the distance between each second actual pattern and the corresponding vertical line or horizontal line is also calculated. If this distance is greater than a distance threshold, this second actual pattern is set as an outlier. For example, the distance between outliers 833 in image 830 and the corresponding vertical line is greater than the distance threshold.

In step 507, after removing the outliers, linear fitting is executed again to obtain multiple second horizontal lines (for example, horizontal line 841 in an image 840) and multiple second vertical lines (for example, vertical line 842 in the image 840). In step 508, multiple intersection points between the second horizontal lines and the second vertical lines are obtained. In step 509, the transformation matrix is calibrated according to these intersection points. For example, the coordinates of the original second patterns are represented as vector X, the coordinates of the intersection points are represented as vector Y, the transformation matrix is represented as M, and the coordinate transformation is represented as the following equation 1.

$$Y = X \times M \quad \text{[Equation 1]}$$

The length of vector X is 3, which are respectively the X coordinate, Y coordinate, and Z coordinate (set to 1 in two-dimensional space). Similarly, the length of vector Y is 3. The size of transformation matrix M is 3×3. By substituting multiple vectors X and Y into equation 1, each value in matrix M may be calculated through an optimization algorithm.

Figure 9:
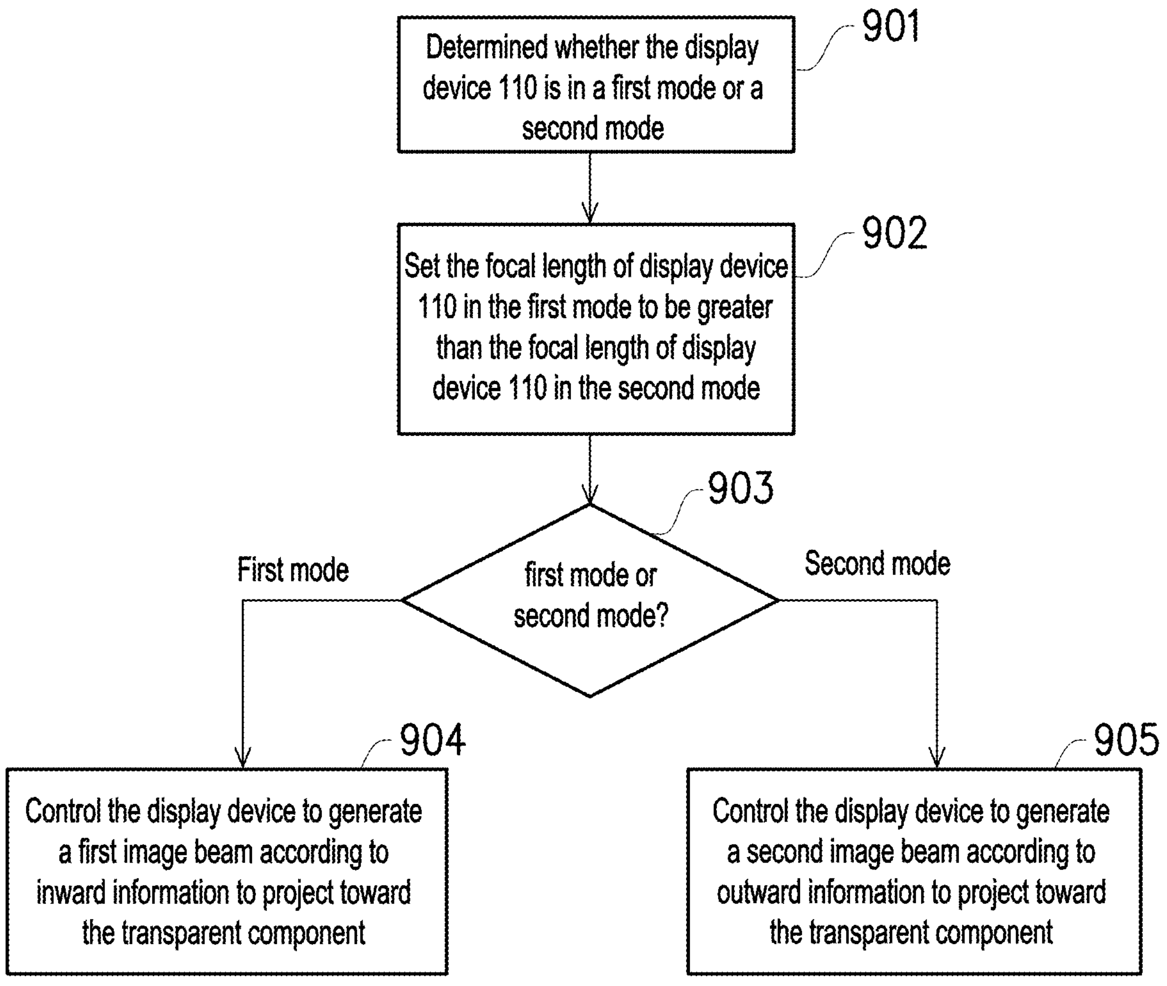
FIG. 9 is a flowchart illustrating a vehicle display method according to an embodiment.

FIG. 9 is a flowchart illustrating a vehicle display method according to an embodiment, and this method is executed by the processor 120. In step 901, it is determined whether the display device 110 is in a first mode or a second mode. In step 902, the focal length of display device 110 in the first mode is set to be greater than the focal length of display device 110 in the second mode. In step 903, it is determined whether it is currently in the first mode or the second mode. If it is in the first mode, in step 904, the display device 110 is controlled to generate a first image beam according to inward information to project toward the transparent component 140. If it is in the second mode, in step 905, the display device 110 is controlled to generate a second image beam according to outward information to project toward the transparent component 140. Each step in FIG. 9 has been described in detail as above, and the description will not be repeated here. It is worth noting that each step in FIG. 9 may be implemented as multiple program codes or circuits, and the present invention is not limited thereto. In addition, the method of FIG. 9 may be used in combination with the above embodiments or may be used independently. In other words, other steps may also be added between the steps of FIG. 9.

In the above system and method, two modes are designed to respectively display information to the internal driver and external users, thereby providing various different applications. In addition, the above embodiments also propose an image calibration procedure to solve problems such as ghost images and image distortion.

Although the present invention has been disclosed above with embodiments, they are not intended to limit the present invention. Any person having ordinary knowledge in the technical field may make slight modifications and refinements without departing from the spirit and scope of the present invention. Therefore, the protection scope of the present invention shall be defined by the appended claims.

What is claimed is:

1. A vehicle display system, comprising:

a display device configured to project an image beam toward a transparent component of a vehicle; and a processor electrically connected to the display device and configured to determine whether the display device is in a first mode or a second mode, wherein a focal length of the display device in the first mode is greater than a focal length of the display device in the second mode, wherein in the first mode, the display device generates the image beam according to inward information, wherein in the second mode, the display device generates the image beam according to outward information, wherein the processor is configured to execute a calibration procedure, the calibration procedure comprising:

controlling the display device to project a reference image onto the transparent component, wherein the reference image comprises a plurality of first patterns, each of the first patterns comprises a second pattern, and the first patterns are different from the second patterns;

capturing an actual image corresponding to the reference image toward the transparent component through an image sensor;

performing binarization on the actual image according to a threshold to obtain a binarized image;

detecting a plurality of first actual patterns in the binarized image, and calculating an average and a standard deviation of areas of the first actual patterns; and determining whether to remove at least one of the first actual patterns according to the average and the standard deviation to obtain a plurality of remaining patterns;

when a quantity of the remaining patterns is greater than a quantity of the first patterns, increasing the threshold;

when the quantity of the remaining patterns is less than the quantity of the first patterns, decreasing the threshold; and when the quantity of the remaining patterns is equal to the quantity of the first patterns, outputting the remaining patterns.

2. The vehicle display system as described in claim 1, wherein an angle at which the display device emits the image beam in the first mode is different from an angle at which the display device emits the image beam in the second mode.

3. The vehicle display system as described in claim 2, wherein the transparent component comprises an electrochromic module electrically connected to the processor, wherein the processor controls the electrochromic module to be in a transparent state in the first mode, and controls the electrochromic module to be in a haze state in the second mode.

4. The vehicle display system as described in claim 1, further comprising:

an image sensor configured to capture an environment image, wherein in the second mode, the processor is configured to detect an object in the environment image and determine a position where the outward information is displayed on the transparent component according to a position of the object.

5. The vehicle display system as described in claim 1, wherein the calibration procedure further comprises:

detecting a plurality of second actual patterns within ranges of the remaining patterns, and obtaining a coordinate of each of the second actual patterns;

performing linear fitting according to the coordinates to obtain a plurality of first horizontal lines and a plurality of first vertical lines, and removing at least one outlier from the second actual patterns;

after removing the outlier, re-executing the linear fitting to obtain a plurality of second horizontal lines and a plurality of second vertical lines, obtaining a plurality of intersection points between the second horizontal lines and the second vertical lines; and calibrating a transformation matrix according to the intersection points.

6. The vehicle display system as described in claim 1, wherein the outward information comprises charging information, contact information, a barcode, or an advertisement, and the inward information comprises vehicle speed information, navigation information, or vehicle detection information.

7. The vehicle display system as described in claim 6, wherein the processor is communicatively connected to an external device, receives a setting from the external device, and determines the outward information according to the setting.

8. A vehicle display method executed by a processor, wherein a vehicle comprises a display device and a transparent component, the vehicle display method comprising:

determining whether the display device is in a first mode or a second mode; and setting a focal length of the display device in a first mode to be greater than a focal length of the display device in the second mode;

in the first mode, controlling the display device to generate a first image beam according to inward information to project toward the transparent component;

in the second mode, controlling the display device to generate a second image beam according to outward information to project toward the transparent component; and executing a calibration procedure, wherein the calibration procedure comprising:

controlling the display device to project a reference image onto the transparent component, wherein the reference image comprises a plurality of first patterns, each of the first patterns comprises a second pattern, and the first patterns are different from the second patterns;

capturing an actual image corresponding to the reference image toward the transparent component through an image sensor;

performing a binarization on the actual image according to a threshold to obtain a binarized image;

detecting a plurality of first actual patterns in the binarized image, calculating an average and a standard deviation of areas of the first actual patterns; and determining whether to remove at least one of the first actual patterns according to the average and the standard deviation to obtain a plurality of remaining patterns;

when a quantity of the remaining patterns is greater than a quantity of the first patterns, increasing the threshold;

when the quantity of the remaining patterns is less than the quantity of the first patterns, decreasing the threshold; and when the quantity of the remaining patterns is equal to the quantity of the first patterns, outputting the remaining patterns.

9. The vehicle display method as described in claim 8, further comprising:

controlling an angle at which the display device emits the first image beam in the first mode to be different from an angle at which the display device emits the second image beam in the second mode.

10. The vehicle display method as described in claim 9, wherein the transparent component comprises an electrochromic module, the vehicle display method further comprising:

controlling the electrochromic module to be in a transparent state in the first mode, and controlling the electrochromic module to be in a haze state in the second mode.

11. The vehicle display method as described in claim 8, further comprising:

capturing an environment image through an image sensor; and in the second mode, detecting an object in the environment image, and determining a position where the outward information is displayed on the transparent component according to a position of the object.

12. The vehicle display method as described in claim 8, wherein the calibration procedure further comprises:

detecting a plurality of second actual patterns within ranges of the remaining patterns, and obtaining a coordinate of each of the second actual patterns;

performing linear fitting according to the coordinates to obtain a plurality of first horizontal lines and a plurality of first vertical lines, and removing at least one outlier from the second actual patterns;

after removing the outlier, re-executing the linear fitting to obtain a plurality of second horizontal lines and a plurality of second vertical lines;

obtaining a plurality of intersection points between the second horizontal lines and the second vertical lines; and calibrating a transformation matrix according to the intersection points.

13. The vehicle display method as described in claim 8, wherein the outward information comprises charging information, contact information, a barcode, or an advertisement, and the inward information comprises vehicle speed information, navigation information, or vehicle detection information.

14. The vehicle display method as described in claim 13, further comprising:

receiving a setting from an external device, and determining the outward information according to the setting.

* * * * *